Oct. 27, 1953    A. N. HOVLAND    2,656,996
PARACHUTE HAVING AN INFLATABLE OPENING MEANS
Filed March 12, 1951    2 Sheets-Sheet 1
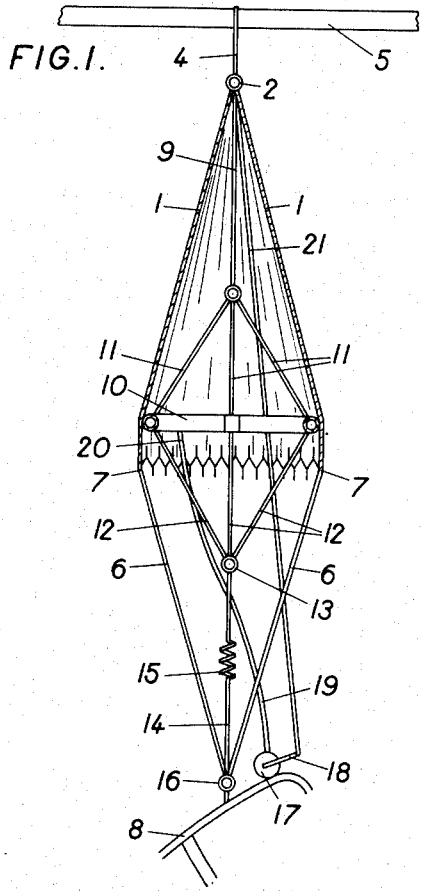
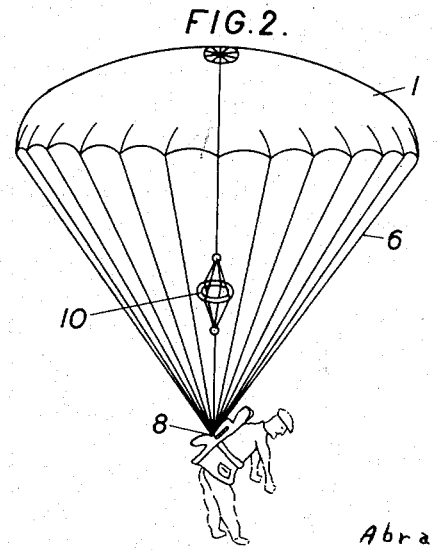
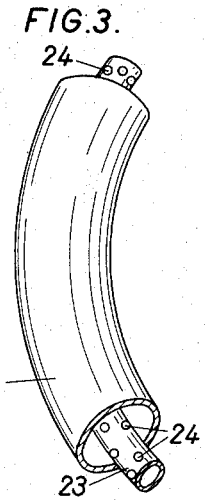
Abraham Nilsen Hovland
    Inventor.
By: Henderoth, Lind & Ponack
    Attorneys.

Oct. 27, 1953          A. N. HOVLAND          2,656,996
PARACHUTE HAVING AN INFLATABLE OPENING MEANS
Filed March 12, 1951                      2 Sheets-Sheet 2
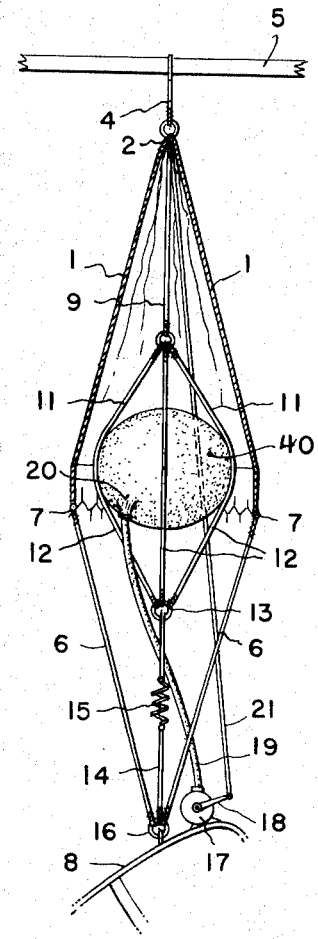
INVENTOR
ABRAHAM NILSEN HOVLAND,
ATTORNEYS Patented Oct. 27, 1953

2,656,996

UNITED STATES PATENT OFFICE 2,656,996

PARACHUTE HAVING AN INFLATABLE OPENING MEANS

Abraham Nilsen Hovland, Roa, near Oslo, Norway

Application March 12, 1951, Serial No. 215,056
In Norway March 15, 1950

3 Claims. (Cl. 244—149)

The present invention relates to parachutes and especially to arrangements and means adapted to provoke and accelerate opening of a parachute after the parachutist has jumped.

Different means have previously been suggested for this purpose. Thus it has been proposed to provide an inflatable annulus to form the edge portion of the parachute cloth, and also inflatable tubes extending from the centre of said cloth towards the edge thereof, in combination with pressure fluid container adapted to deliver pressure fluid to said annulus and or tubes so as to inflate the same immediately after the parachutist has jumped, such delivery of pressure fluid being started either automatically or upon the initiative of the jumper. Such means have, however, a number of drawbacks, which have prevented their use in practice.

Thus the long tubes to be inflated have increased the total weight of the parachute so much that it was necessary to materially increase the area of the parachute cloth. Moreover the volume of pressure fluid was rather great, and not inconsiderable lapse of time was necessary for inflating the tubes. Moreover the tubes to be inflated often got sharp folds when they were packed into the knapsack to be carried by the parachutist, which sharp folds hindered the free flow of pressure fluid through the tubes, so that often only a short section of a tube was inflated and in fact inflated so much that it would burst.

It is the object of the present invention to eliminate such drawbacks.

The basic idea of the invention resides in the use of means which, at the moment when the parachute has become substantially stretched out and prior to opening of the parachute having taken place, provides an initial opening at the lowermost circumference of the parachute, whereby a chimney action or draught is provoked, which very rapidly opens the parachute.

For this purpose I suspend from the centre point of the parachute cloth, by means of a rope or ropes shorter than the radius of the parachute cloth, an inflatable organ, for example an annulus or a substantially spherical bladder, of substantially smaller diameter when inflated than the diameter of the parachute when opened, said inflatable organ being connected by a tube or tubes with a pressure fluid reservoir mounted on the knapsack or harness and having a valve for admitting pressure fluid to the inflatable organ.

The invention also provides means for automatic opening of said valve just prior to tightening of the parachute cloth and the cords connecting the latter with the harness taking place. For this purpose a string is extended from the centre point of the parachute cloth to a lever operating said valve, the length of said string being less than the sum of the radius of the parachute cloth and each suspension cord extending from the edge of said cloth to the harness.

As mentioned above the inflatable organ may take different forms, but always its diameter is substantially less than that of the opened parachute. Thus the inflatable organ may be an annulus suspended by a number of cords, so that correct position of the annulus within the parachute is ensured. Or the inflatable organ may consist of a bladder, suspended as described, which bladder may be such that it bursts due to the pressure of the pressure gas after the bladder has been inflated and has spread out the edge of the parachute cloth, so that a chimney action takes place.

In order to avoid formation of sharp folds in a hose or annulus as described above, I may use a hose of special construction. According to a feature of the invention such hose may consist of an outer envelope of easily flexible and air tight material, within which hose is provided a tube of substantially less diameter than the envelope, which tube prevents formation of sharp folds when the outer envelope hose is packed into the knapsack. Said inner tube may with advantage be provided with perforations distributed along its length to ensure delivery of pressure fluid to all parts of the envelope to be inflated.

On the drawing:

Figure 1 diagrammatically shows a vertical section through a parachute just after the devices according to the invention have started to act.

Figure 2 shows a parachute in opened condition and the new device suspended therefrom.

Figure 3 shows, on a larger scale part of an inflatable member in the form of a hose of special construction.

Figure 4 shows a vertical section through a portion of the parachute in which the inflatable member is a substantially spherical bladder.

On the drawing numeral 1 designates the parachute cloth, the centre point 2 of which is attached to a suitable member 5 of an aircraft by means of string 4, which may be easily broken. Numeral 6 designates the cords extending from the parachute cloth 1 to the harness 8 forming part of the knapsack carried by the person who is to use the parachute. Suspended from a rope 9 there is provided an inflatable organ 10, for example a hose 10 as shown in Fig. 1, or an inflatable bladder 22 which is torus-shaped as in Fig. 3 or a spherical inflatable bladder 40 as in Fig. 4, by means of a number of cords 11, which are secured to the hose at different places along its length. From the hose 10 also extend cords 12 to a junction 13, from which a preferably resilient rope 14 extends to and is secured to the harness 8 at 16. If desired a resilient member or portion 15 may be inserted in the length of said rope 14. The described arrangement of cords and ropes ensures that the organ 10 maintains a correct position within the parachute cloth in relation to the periphery of the latter.

On the knapsack or the harness 8 is attached a container 17 filled with compressed gas and provided with a lever 18 adapted to open a valve of the container. A pipe 19 extends from the pressure container 17 to the annular hose 10. If desired the pipe 19 may be connected with the annular hose 10 through a non-return valve 20. From the valve lever 18 to the centre point 2 of the parachute cloth 1 extends a string 21 the length of which is somewhat shorter, say one meter shorter, than the length of the radius of the parachute cloth plus the length of a cord 6.

When the parachutist jumps the arrangement acts as follows:

Within the knapsack is stored the parachute with its cords and ropes and the inflatable member such as the hose 10 (Fig. 1), the torus member 22 (Fig. 3) or the spherical bladder (Fig. 4), this in the uninflated condition. As the parachutist leaves the aircraft the parachute is straightened out due to its connection with the member 5. Just before the weight of the jumper becomes transferred to the cords 6 and the cloth 1 the string 21 pulls the lever 18 and the valve of container 17 is opened. The string 21 may be provided with a weak portion so that it breaks immediately after having opened the valve. The gas under pressure then flows from the container 17 through the pipe 19 and in the course of a very short time inflates the inflatable organ, so that the latter takes the shape illustrated in Figure 1, Figure 2, Figure 3 or Figure 4. By employing the annular inflatable organ as in Figs. 1-3, the periphery of the parachute cloth is spread out to such an extent that a chimney is formed, through which air has free access. This causes a substantially instantaneous opening of the parachute. Tests have shown, that parachutes constructed as described above open completely on a fall of 22–25 meters.

When the parachute has been completely opened the annulus 10 will be suspended below the parachute, as illustrated in Figure 2. The annulus 10 may easily be so arranged that it by simple manipulations may be released from its connection with the parachute and serve as a lifebuoy if the jumper should happen to descend on to water.

Instead of the annulus 10 shown, may be used a bladder 40 of elastic material as shown in Fig. 4, for example similar to a big football bladder, which is placed within the parachute cloth at the same place as the annulus 10. This bladder may consist of so thin material that it will burst after having been inflated to a certain degree by the pressure gas arriving from the container 17.

When hoses of thin, flexible material are used for accelerating opening of a parachute there is a risk that they, when packed in the knapsack, get sharp folds which may cause that only a short section of the hose is inflated when pressure gas is admitted, which section perhaps will burst and disturb the entire action aimed at.

Figure 3 illustrates an arrangement adapted to prevent this, the figure showing a section of a hose construction. The latter comprises an outer hose 22 of thin and soft material that is easy to pack into the knapsack. In order to eliminate the risk for the hose section getting sharp, tight folds by such packing a flexible thin organ 23 of substantially smaller diameter than the inner diameter of the hose 22 in inflated condition of the latter, is placed within the hose 22. The organ 23 prevents that sharp folds are formed when the hose 22 is packed, so that the pressure gas can rapidly fill the entire hose. The thin organ 23 preferably takes the form of a tube provided with perforations 24 distributed along its entire length. The tube 23 is made of somewhat stiffer material than it is possible to use for the hose 22 and prevents formation of sharp folds in the latter, and the perforations ensure complete distribution of the pressure gas during the inflating operation.

I claim:

1. A parachute comprising a substantially circular parachute cloth, a harness, lines connecting the edge of said cloth to said harness, a spherical inflatable bladder smaller in its inflated diameter than the diameter of said parachute cloth, a rope shorter than the radius of said parachute cloth connected at one end to the center point of said parachute cloth and at the other end to said inflatable bladder, to suspend said bladder from said parachute cloth, a pressure fluid reservoir mounted on said harness for admitting fluid under pressure to inflate said inflatable bladder, said pressure fluid reservoir provided with actuating means connecting said reservoir to the center of said parachute cloth to automatically admit fluid under pressure from said reservoir to said bladder when the parachute is opened, and tubular means connecting said inflatable bladder to said pressure fluid reservoir.

2. A parachute comprising a substantially circular cloth, a harness, lines connecting the edge of said cloth to said harness, a spherical inflatable bladder smaller in its inflated diameter than the diameter of said parachute cloth, a rope shorter than the radius of said parachute cloth connected at one end to the center point of said parachute cloth and at the other end to said inflatable bladder to suspend said bladder from said parachute cloth, a pressure fluid reservoir mounted on said harness and connected to the center of said parachute cloth with a string actuating means, and to said inflatable bladder, an automatically opening valve in said pressure fluid reservoir connected to said string actuating means to admit fluid under pressure from said reservoir to open and to burst said inflatable bladder when the parachute is in an extended and unopened condition, and tubular means connecting said inflatable bladder to said reservoir.

3. In a parachute comprising a substantially circular parachute cloth and a harness connected to the edge of said cloth, that improvement comprising an inflatable torus-shaped bladder which is smaller in diameter than the diameter of said parachute cloth and is suspended between said harness and said cloth, said bladder constituted by an outer flexible tubular envelope and an inner tubular flexible member of substantially greater thickness than said outer envelope, said inner tubular member being perforated and having a substantially smaller outer diameter than the inner diameter of said outer envelope, said bladder adapted to be filled by a fluid under pressure from a fluid pressure reservoir on said harness having an automatic string actuated opening valve which opens by the extension of the parachute in unopened condition to fill and burst said bladder.

ABRAHAM NILSEN HOVLAND.

References Cited in the file of this patent

UNITED STATES PATENTS

| Number | Name | Date |
|---|---|---|
| 790,971 | Nicholls | May 30, 1905 |
| 1,387,455 | Coughlin | Aug. 16, 1921 |
| 1,740,044 | Simmons | Dec. 17, 1929 |
| 1,861,784 | Brown | June 7, 1932 |
| 1,928,992 | Clark | Oct. 3, 1933 |

FOREIGN PATENTS

| Number | Country | Date |
|---|---|---|
| 29,319 | Great Britain | of 1911 |
| 400,127 | Italy | Nov. 25, 1942 |
| 852,984 | France | Nov. 18, 1939 |